United States Patent [19]
Reichert

[11] 3,850,333
[45] Nov. 26, 1974

[54] DISPOSABLE FOOD TRAY AND CLOSURE MEMBER

[76] Inventor: Donald E. Reichert, 2650 S. Patton Ave., San Pedro, Calif. 90731

[22] Filed: June 11, 1973

[21] Appl. No.: 368,975

[52] U.S. Cl............. 220/20, 206/4, 220/23.8, 220/42 A
[51] Int. Cl....... A45c 11/20, B65d 1/24, B65d 1/36
[58] Field of Search.......... 220/9 F, 20, 23.8, 23.6, 220/42 A; 206/4; 229/2.5

[56] References Cited
UNITED STATES PATENTS

| | | | |
|---|---|---|---|
| 2,641,912 | 6/1953 | Lawler | 220/23.8 |
| 3,240,610 | 3/1966 | Cease | 220/23.6 |
| 3,426,935 | 2/1969 | Sweft | 220/42 A |
| 3,532,247 | 10/1970 | Bridges | 220/23.6 |
| 3,754,640 | 8/1973 | Bridges | 220/23.8 |
| 3,799,386 | 3/1974 | Madalin | 220/23.8 |

*Primary Examiner*—George E. Lowrance

[57] ABSTRACT

A light weight, portable, disposable food tray and closure member therefor formed from a heat insulating material, with the tray defining a number of spaced downwardly extending cups, each of which cups is adapted to hold a different food. The tray has an elongate intermediate positioned sealing area defined thereon that divides the cups into first and second portions, with the first portion being adapted to hold foods in a hot condition, and the second portion of the cups serving to hold cold foods.

The tray includes a first continuous side wall that extends downwardly and outwardly from the periphery thereof at a wedged angle. The closure member includes a sheet of heat insulating material that has a second continuous side wall that also extends downwardly and outwardly therefrom at a wedging angle, with the second side wall when the closure member is moved downwardly relative to the tray frictionally engaging the first side wall to removably support the closure member on the tray.

The closure member includes an indented intermediate positioned sealing member that engages the matching sealing area of the tray when the closure member is in frictional gripping contact with the tray, and cooperating with the tray and closure member to provide first and second portions that are heat insulated from one another. Consequently, food in the cups of the first portion remain hot for a prolonged period of time, and food in the second portion likewise remains cold, with a minimum of heat transferred between the cups due to the heat insulating characteristic of the material defining the cups. Both the tray and the closure member are preferably formed from a polymerized resin that is light weight and has either a closed or open cellular structure, such as "Styrofoam" or the like.

5 Claims, 5 Drawing Figures

PATENTED NOV 26 1974
3,850,333
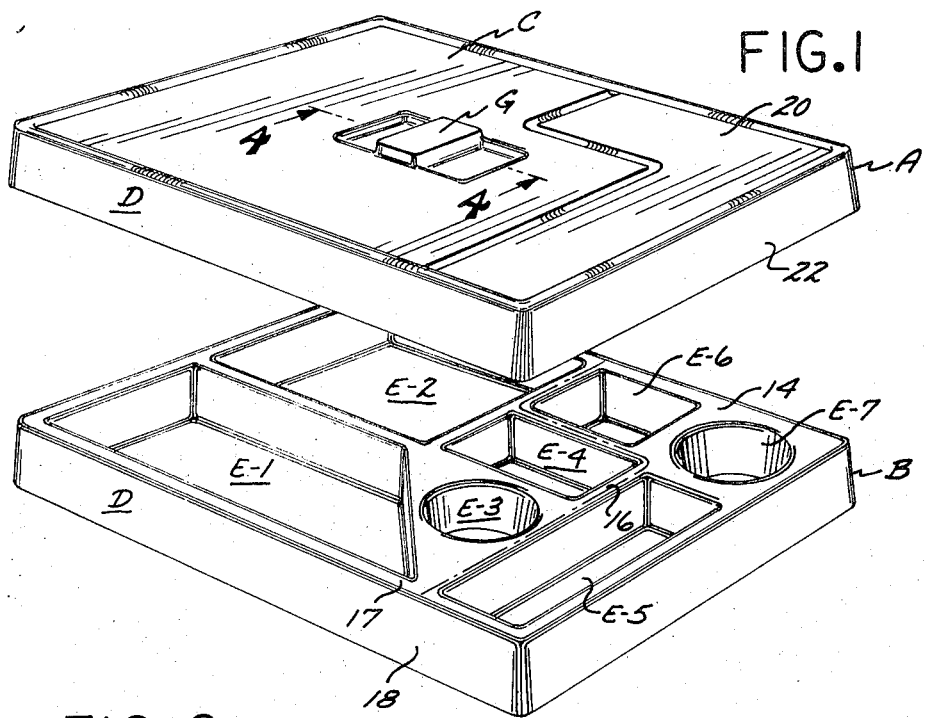
FIG.1
FIG.2
FIG.5
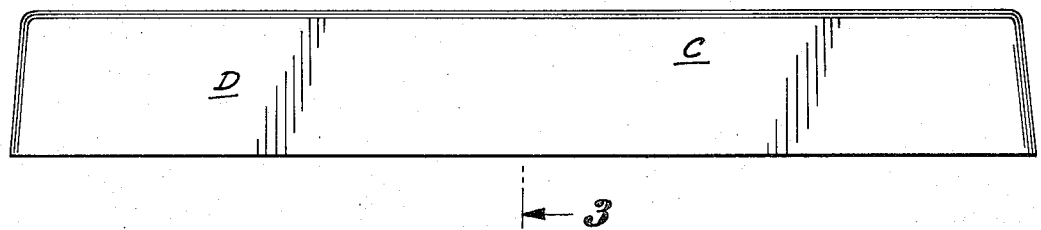
FIG.3
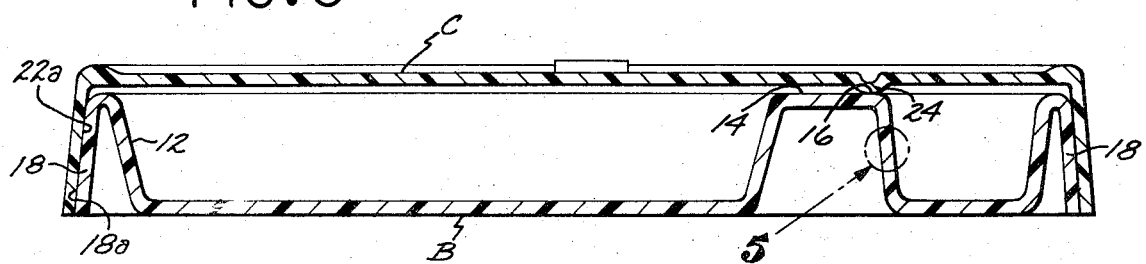
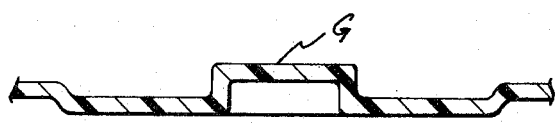
FIG.4

３,850,333

DISPOSABLE FOOD TRAY AND CLOSURE MEMBER

BACKGROUND OF THE INVENTION

1. Field of the Invention

A disposable food tray and closure member.

2. Description of the Prior Art

Although disposable food trays have been devised and used in the past, such trays have had the operational disadvantage that it is not possible to maintain both hot and cold food therein for a prolonged period of time without the use of auxiliary equipment. The primary purpose in devising the present invention is to supply a disposable tray having a number of cups defined therein in which the food is placed in both a hot and cold condition, and a closure member that removably engages the tray and seals therewith to the extent that the food placed in the tray remains hot and cold for a prolonged period of time without the use of auxiliary equipment. The invention is particularly adapted for use in hospitals, rest homes and the like due to its convenience of use and low cost.

SUMMARY OF THE INVENTION

A light weight portable disposable tray and closure member that are individually formed as integral units from a heat insulating material, preferably a polymerized resin of the closed or open cellular type. The tray includes a first sheet on which a number of spaced openings are formed, each having a cup extending downwardly therefrom. The cups are divided into first and second portions by an intermediate positioned sealing area in the first sheet. A first continuous side wall extends downwardly and outwardly from the periphery of the first sheet at a wedging angle thereto.

A closure member is provided that has a second sheet that has a continuous second side wall that extends downwardly and outwardly from the periphery therefrom at a wedging angle, matching the wedge angle of the trays and the second side wall capable of frictionally engaging the first wall to removably hold the closure member of the tray. The second sheet has an indented sealing member formed therein that is alignable with and matched to the sealing area when the closure member and the tray are in engagement. The sealing member and sealing area cooperate with the tray and closure member to prevent heat of the foods in first portions of the cups on one side of the sealing area being transferred to cold foods area in second portions of the cups in the other side of said sealing area.

BRIEF DESCRIPTION OF THE DRAWINGS

FIG. 1 is a perspective view of a light weight disposable food holding tray that may contain both hot and cold foods, and a removable closure member for engaging the tray to prevent heat being converted or transferred from the hot foods to the cold foods, as well as heat being radiated from the hot foods to the ambient atmosphere;

FIG. 2 is a side elevational view of the device shown in FIG. 1 when the closure member is in full engagement with the tray;

FIG. 3 is a longitudinal cross sectional view of the tray when the closure member is positioned thereon;

FIG. 4 is a fragmentary longitudinal cross sectional view of the closure member taken on the line 5—5 of Figure; and FIG. 5 is an enlarged fragmentary cross sectional view of a section of the heat insulating material used in defining the tray and closure member, and taken within the confines of the circle shown in phantom line on FIG. 3 and identified by the numeral 6.

DESCRIPTION OF THE PREFERRED EMBODIMENT

The invention A as shown in FIG. 1 includes a tray B in which both hot and cold foods (not shown) are held in spaced relationship, and the tray B being removably engageable by a closure member C. Both the tray B and closure member C are formed from a light weight inexpensive material D, preferably a polymerized resinous foam of the cellular type. The material D may be Polystyrene beads 10 that are bonded together by conventional means, of manufactured as a cellular sheet initially shown in FIG. 3 with at least the surface 12 thereof having a sealed or closed water impervious finish defined thereon. The finish 12 is defined on the surface by conventional means. Tray B and closure member C are each preferably formed as individual parts or a single unit by molding or the like.

The tray B as best seen in FIG. 2 is defined by a first flat sheet 14 that has a number of spaced openings formed therein, each of which openings develops into a downwardly extending cup in the first portion thereof, which cups are for convenience identified in the drawing as E-1, E-2, E-3 and E-4. An intermediate indented elongate seal area 16 is defined on the upper surface of the sheet 14, and the cups defined on the right hand side of the seal area 16 as viewed in FIG. 2 are identified in the drawing by the notation E-5, E-6 and E-7.

In the drawing it will be seen that the cups E-1 to E-7 are of various shapes, with each shape being dictated by the particular food, condiment, or eating accessory to be held therein. The first sheet 14 has a margin 17 extending around the periphery thereof that on the outer extremity thereof develop into a continuous first side wall 18 that extends downwardly and outwardly at a wedging angle as shown in FIG. 3.

The closure member C is defined by a second sheet 20 that has a second continuous side wall 22 extending downwardly and outwardly from the periphery thereof at a wedging angle, and with the interior surface 22a of the second side wall being adapted to frictionally engage the exterior surface 18a of the first side wall 18 when the closure member C is moved downwardly on the tray B to the position shown in FIG. 3.

The second sheet 20 as shown in FIGS. 1 and 3 includes an elongate intermediately positioned indented downwardly extending sealing rib 24 which when the closure member C is positioned on the tray B is in pressure sealing contact with the sealing area 16. The closure member C as may be best seen in FIG. 1 has a handle G molded thereinto of desired configuration to permit the closure member C to be lifted upwardly relative to the tray B when the handle is grasped by the fingers of the user.

The use and operation of the invention is extremely simple, with foods that are desired to remain hot being placed in the cups E-1 to E-4 inclusive, and those being desired to remain cold being placed in the cups E-5 to E-7. Of course, the cup E-5 may be used to hold a desired fork, knife and spoon or napkin as desired. After the foods (not shown) have been placed in the cups E-1 to E-7 in hot and cold condition the closure member C is moved downwardly to occupy the position shown in FIG. 3. The sealing rib 24 is in pressure contact with the sealing area 16, and the tray B and closure member C due to being formed from a heat insulating material D, maintain the food in the hot and cold condition due to there being a minimum of heat transfer between the cups E-1 to E-4 and the cups E-5 to E-7 inclusive. Likewise, there is a minimum of heat radiated from the food in the cups E-1 and E-4 inclusive to the ambient atmosphere due to the heat insulating characteristics of the material. The first and second sidewalls 18 and 22 passes some resiliency and due to engaging one another at a wedging angle deform slightly and to the extent that closure member C tends to remain on tray B until forcibly separated from the latter.

When the tray B and closure member C have served their intended purpose, the tray and closure member C may be discarded. The tray B and closure member C above described are particularly useful in hospitals, rest homes and the like, as the trays may be delivered to patients without use of auxiliary equipment to maintain the foods therein in hot and cold condition, and the trays and closure members after having served their intended purpose may be discarded, or burned. As a result cross infection between patients in such institutions is minimized. The tray B and closure member C of course is not limited to use in hospitals and like institutions, but may be used on airlines and other vehicles where food is desired to be maintained both in hot and in cold condition.

The use and operation of this invention has been explained in detail and need not be repeated.

I claim:

1. A light weight portable disposable device capable of holding a plurality of different foods, with a first portion of said foods maintained in a hot condition and a second portion of foods in a cold condition, said device including:

a. a first sheet formed from a heat insulating material that has a plurality of spaced openings formed therein, with said sheet at the periphery of each of said openings developing into a downwardly extending cup in which one of said foods may be disposed, and an elongate seal area that occupies an intermediate position on said sheet, with the said seal area serving to divide said cups into first and second portions said first portion of said cups serving to hold said foods that are hot, said second portion of said cups serving to hold said foods that are cold, and a continuous side wall that extends downwardly and outwardly from the outer periphery of said sheet at a wedging angle to at least as great a depth as the depth of the deepest of said pockets;

b. a closure member that includes a second sheet formed from a heat insulating material that has a second endless sidewall extending downwardly and outwardly from the periphery thereof at a wedging angle, with said closure member when moved downwardly relative to said first sheet and in alignment therewith having said second sidewall removably and frictionally grip said first said wall with a sufficient force to remain disposed thereon until said first sheet and closure member are forcefully separated from one another; and c. heat insulated sealing means on said second sheet that are so disposed as to contact said seal area when said closure member is disposed on said first sheet with said first and second side walls in frictional engagement with one another, with said closure member and sealing means cooperating with said first sheet and seal area to completely enclose said first and second portions, and with heat from food in said cups in said first portion being retained therein for a prolonged period of time due to said cups being formed from said heat insulating material that minimizes transfer of heat thereto to the ambient atmosphere, and said first and second sheets and heat insulated sealing means minimizing the transfer of heat from hot food in said first portions of cup to cold food in said second portions of said cups.

2. A device as defined in claim 1 in which said first and second sheets, said cups, said first and second sidewalls and said sealing means are defined by a cellular polymerized resin foam.

3. A device as defined in claim 2 in which the upper surface of said first sheet and the interior surfaces of said cups have a sealed water impervious finish.

4. A device as defined in claim 1 in which said heat insulated sealing means is a rib that extends downwardly from said second sheet and pressure contacts said seal area when said closure member is in a closing position on said first sheet, first side wall and said cups.

5. A device as defined in claim 4 in which said rib is of indented configuration and formed as an integral part of said second sheet.

* * * * *